Patented Sept. 7, 1937

2,092,518

UNITED STATES PATENT OFFICE 2,092,518

FOOD PRODUCT AND METHOD OF MAKING THE SAME

Anna S. Lipson and Harry A. Lipson, Cleveland Heights, Ohio

No Drawing. Application April 8, 1936, Serial No. 73,304

3 Claims. (Cl. 99—146)

This invention relates to a food product comprising a stable homogeneous mixture of butter, honeycomb and honey. By the term "honeycomb" is meant the solid, waxy, cellular portion of comb honey whereas by the term "honey" is meant the liquid portion of natural comb honey.

After considerable experimentation we have discovered a method by which we are able to produce this mixture in a stable homogeneous and palatable form. The process consists essentially in forming a thorough mixture of honey and honeycomb by elevating these ingredients to a temperature to melt the honeycomb. This mixture is thoroughly mixed with freshly made butter, having most of the water expressed, yet only slightly worked, at a temperature below the temperature at which butter flows freely, then slowly cooling the mass to a temperature between the freezing point of water and 50° F. and again thoroughly agitating the mass.

Stated in more detail, the preferred form of carrying out our process is to elevate the temperature of natural comb honey containing both the honey and honeycomb in the natural proportions to a temperature high enough to melt the honeycomb portion thereof. This mixture is strained and thoroughly mixed with freshly made butter, from which most of the moisture has been expressed by working very slightly, the butter fat content being about 35% to 40% of the weight of the total mixture, the temperatures of the two portions being such before the mixture that the resulting temperature of the whole mass will be below the "free flow" point of the butter (herein termed the melting point), preferably only slightly therebelow. The whole mass is then preferably placed in a refrigerating compartment, or otherwise subjected to surroundings at a temperature between 50° F. and the freezing point of water and allowed to cool for a half hour or more after which it is again thoroughly agitated. The last agitation may be delayed several hours, even overnight, after the ingredients are first brought together.

It is imperative that the cooling of the final mixture be not too rapid since this will destroy the homogeneity and stability of the product. Perfect results may be obtained where the cooling results from the mass being subjected to surroundings between 32° and 50° F. Subjecting the mass to temperatures materially lower than 32° F. results in a poor produce and one which is not thoroughly homogeneous and stable.

Obviously other ingredients may be added to the final product as desired and we consider it within the scope of our invention to add other materials either during the process of production or thereafter so long as such materials do not affect the homogeneity or stability of the essential combination described above.

While we have described the essential novel product and the present preferred method of making the same, we are aware that variations may be made and we do not wish to be limited except in accordance with the appended claims and the prior art.

Having thus described our invention, what we claim is:—

1. A method of making a stable homogeneous mixture of butter, honeycomb and honey comprising the steps of forming a substantially homogeneous mixture of honeycomb and honey at a temperature above the melting point of the honeycomb, thoroughly admixing the same with freshly made butter, the temperatures being such that the butter will not be melted, slowly cooling the resulting mixture to a temperature between 32° and 50° F. and then agitating the final mixture.

2. A method of making a stable homogeneous mixture of butter, honeycomb and honey comprising the steps of forming a substantially homogeneous mixture of honeycomb and honey at a temperature above the melting point of the honeycomb, thoroughly mixing the same with freshly made butter, the temperature of the components being such as to avoid melting the butter, the butter being present in proportion of one-third to one-half the total mixture, cooling the mass by subjecting it to a surrounding temperature between 32° and 50° F. and then agitating the final mixture.

3. A method of making a stable homogeneous mixture of butter, honeycomb and honey comprising the steps of forming a substantially homogeneous mixture of honeycomb and honey at a temperature above the melting point of the honeycomb, thoroughly mixing the same with freshly made butter, the temperature of the components being such as to avoid melting the butter, the butter being present in proportion of one-third to one-half the total mixture, and said honey and honeycomb being present in approximately the relative proportions in which they occur in natural comb honey, cooling the mass by subjecting it to a surrounding temperature between 32° and 50° F. and then agitating the final mixture.

ANNA S. LIPSON.
HARRY A. LIPSON.